Feb. 28, 1950     C. M. JOHNSON     2,499,315

RIVET

Filed July 11, 1944

INVENTOR
Corydon M. Johnson
BY
Blair, Curtis & Hayward
ATTORNEYS

Patented Feb. 28, 1950

2,499,315

UNITED STATES PATENT OFFICE 2,499,315

RIVET

Corydon M. Johnson, Freeport, N. Y.

Application July 11, 1944, Serial No. 544,383

2 Claims. (Cl. 85—37)

This invention relates to a rivet.

It is an object of the invention to provide a rivet that has high bearing and shear values, which will produce a tight joint at the point of its placement in securement of one or more members together.

It is another object of the invention to construct the rivet of such materials that compared with rivets that are presently used it will be of considerably smaller size than a rivet of equal strength values.

It is a further object of the invention to provide a rivet that may be set without the use of other than the ordinary tools that are today used to set rivets of the conventional construction.

Other objects of the invention will appear and be set forth in the following specification, and it is therefore deemed unnecessary to set them forth in detail at this point.

Figure 1:
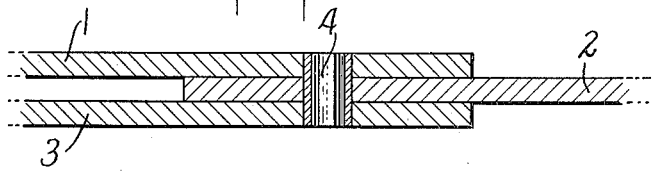
Figure 1 is a fragmental view showing three plates that are arranged for securement together and showing the shell element of the rivet in position.

I have illustrated three plates 1, 2 and 3, as being secured together by a rivet constructed in accordance with my invention.

The invention consists essentially of a shell 4 and a core 5, which is preferably preheaded on one end as at 6, but the other end of which is not upset but may be upset into the condition shown at 7 in the drawing.

The shell 4 is constructed preferably of spring steel heat treated to a high strength value. I have found an ultimate tension strength value of 220,000 p. s. i. to be desirable and efficient, but I do not wish to be limited to such value.

In forming the shell the sheet stock is cut to exactly the right length to wrap a full 360 degrees when the rivet is emplaced.

Figure 7:
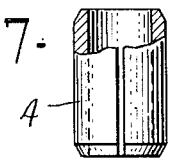
Figure 7 is a view of a modified form.

If desired the ends of the shell may be bevelled, as shown in Figure 7, to facilitate the entry of the shell into the openings in the plate. It is preferable to bevel both ends so that the riveter will not be subjected to the necessity of selecting the entry end.

After forming the shell into substantially tubular form with the edges slightly separated, it is heat-treated to attain a very high degree of strength such as hereinbefore referred to to provide a high strength rivet member.

In placing the rivet the shell is first driven into the aligned openings of the plates and in so doing the edges of the shell are forced into close proximity with each other, thus placing the shell under resilient compression which will react to provide a tight connection between the plates which is maintained by the core.

Because of this adaptability the holes in the plate need not be reamed to close tolerances as is necessary in the use of the current high shear bolts and pins. Moreover the shell need not be manufactured to close tolerances, because of its adaptability, as is necessary in the high shear bolts and pins.

The core 5 of the rivet may be of a relatively soft material as, for instance, aluminum alloy which may be driven and upset cold.

After the shell has been emplaced in the aligned openings of the plates, the driving of the core and the upsetting of its ends expands the core so that it will tightly fit within the shell and indeed cause the shell in turn to expand to force a tight fit in the members that are being secured. The upset ends or heads of the core of course prevent any axial displacement of the shell and will take care of any slight tension in the joint.

Figure 2:
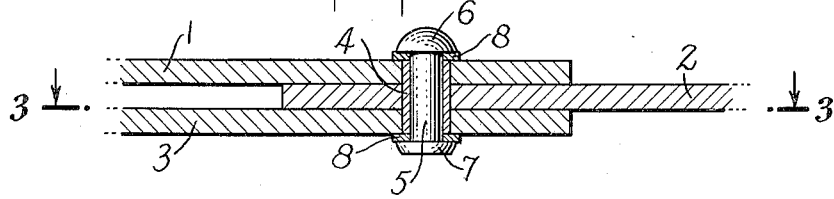
Figure 2 is a similar view showing the rivet in place after the ends of the core have been upset.
Figure 3:
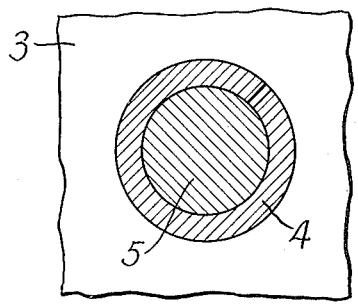
Figure 3 is a sectional view on line 3—3 of Figure 2.
Figure 4:
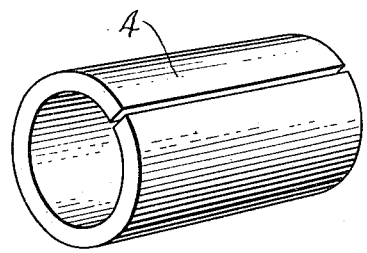
Figure 4 is a perspective view of the shell.

In Figure 2 of the drawings I have illustrated washers 8 as being interposed between the head 6 of the rivet at one end and the upset end 7 of the rivet at the other end and the shell, but it is to be understood that these washers may or may not be used, according to preference.

Figure 5:
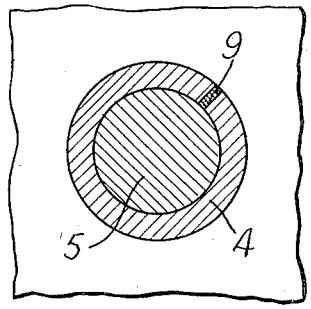
Figure 5 is a sectional view corresponding with Figure 3 but showing the space between the end edges of the shell sealed with a sealing material.
Figure 6:
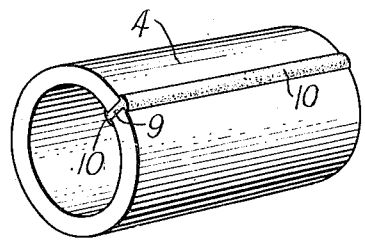
Figure 6 is a perspective view of the shell showing the sealing material in place before the shell is emplaced in the openings of the elements that are to be secured together.

In the form of the invention illustrated in Figures 5 and 6 I have shown the spacing between the edges of the shell as being filled with a relatively soft material 9, such as lead, or some other malleable metal or alloy. It will be noted that a portion 10 of this filler 9 extends beyond the inner and outer surfaces of the shell. Thus when the shell is emplaced and the core driven and upset in the shell the excess material will either operate with the core to compress the entire filler into a tight joint, or will be sheared off as the core is emplaced.

Thus in some instances where it is found, because of peculiar existent conditions or demands, that it is desirable to fill the space between the edges of the shell to assure a sealing element beyond that which is inherent in the construction itself, I may use such a filler, but its use is not an indispensable part of this invention.

Thus it will be seen that I have provided a two-part rivet that will have all of the functions and the attributes and will accomplish all of the results that I have hereinbefore set forth, and I do not wish to be limited to the details of construction shown in the drawings or described in this specification except in so far as the limitation is necessitated by the claims.

What I claim is:

1. A multi-part rivet including an expansible shell of spring metal split longitudinally, a malleable metal filler disposed between the edges of the shell and a malleable core relatively harder than said filler.

2. A multi-part rivet including a relatively hard spring metal expansible, longitudinally split tubular shell having its edges separated, a relatively soft metal filler in the space between said edges and having a portion extending beyond a face thereof, and a malleable metallic core within said shell said core being relatively softer than said shell.

CORYDON M. JOHNSON.

REFERENCES CITED

The following references are of record in the file of this patent:

UNITED STATES PATENTS

| Number | Name | Date |
| --- | --- | --- |
| 1,589,004 | Stone | June 15, 1926 |
| 1,839,964 | Harvey | Jan. 5, 1932 |
| 1,971,433 | Tartrais | Aug. 28, 1934 |
| 2,240,425 | Sternbergh | Apr. 29, 1941 |

FOREIGN PATENTS

| Number | Country | Date |
| --- | --- | --- |
| 303,126 | Great Britain | Sept. 26, 1929 |
| 477,718 | Germany | Dec. 29, 1927 |
| 601,248 | France | Nov. 26, 1925 |